US010415720B2

(12) United States Patent
Quang et al.

(10) Patent No.: US 10,415,720 B2
(45) Date of Patent: Sep. 17, 2019

(54) AUTOMATIC FILL SYSTEM

(71) Applicant: ADEL WIGGINS GROUP, A DIVISION OF TRANSDIGM INC., Los Angeles, CA (US)

(72) Inventors: Christopher Quang, Pasadena, CA (US); Mark Silva, Rancho Cucamonga, CA (US)

(73) Assignee: AdelWiggins Group, a Division of TransDigm Inc., Los Angeles ( * ) Notice: Subject to any disclaimer, the term of this patent is extended or adjusted under 35 U.S.C. 154(b) by 155 days.

(21) Appl. No.: 15/269,821

(22) Filed: Sep. 19, 2016

(65) Prior Publication Data
US 2017/0082215 A1     Mar. 23, 2017

Related U.S. Application Data

(60) Provisional application No. 62/221,993, filed on Sep. 22, 2015.

(51) Int. Cl.
*F16K 49/00* (2006.01)
*B67D 7/82* (2010.01)
(Continued)

(52) U.S. Cl.
CPC ............ *F16K 49/002* (2013.01); *B67D 7/362* (2013.01); *B67D 7/82* (2013.01); *F16K 1/126* (2013.01);
(Continued)

(58) Field of Classification Search
CPC ............. Y10T 137/27; Y10T 137/2273; Y10T 137/6606
See application file for complete search history.

(56) References Cited

U.S. PATENT DOCUMENTS 1,532,189 A * 4/1925 Lamont ................... F02M 1/00
219/205
2,020,492 A * 11/1935 Zahm .................. B67D 1/1252
137/341
(Continued)

FOREIGN PATENT DOCUMENTS

GB            535844 A  *  4/1941  ............. F16K 21/20
GB            559643 A  *  2/1944  ............... B67D 7/48

OTHER PUBLICATIONS

International Search Report for PCT/US16/52964 filed Sep. 21, 2016, ISA/US.

*Primary Examiner* — Mary E McManmon
*Assistant Examiner* — Richard K. Durden
(74) *Attorney, Agent, or Firm* — Fulwider Patton LLP

(57) ABSTRACT

An automatic fill system includes a tank, a transfer hose, and a valve assembly. The valve assembly has a first end having an outlet orifice configured to be received within the tank. The valve assembly also includes a second end configured to be connected in fluid communication with the transfer hose with the second end having an inlet orifice. The valve assembly also includes at least one fluid passageway between the inlet orifice and the outlet orifice, and a check valve coupled to a spring and a seal. The seal is configured to be slidably moveable within a piston chamber. The valve assembly further includes a heating element located within a heating element chamber and configured to heat the valve assembly. Finally, the valve assembly includes a jet level sensor with a sensor inlet and a sensor outlet. The jet level sensor is in fluid communication with the piston chamber.

9 Claims, 5 Drawing Sheets

(51) Int. Cl.
    *F16K 1/12*    (2006.01)
    *F16K 21/18*   (2006.01)
    *B67D 7/36*    (2010.01)
    *F16K 21/20*   (2006.01)
    *B67D 7/46*    (2010.01)

(52) U.S. Cl.
    CPC .............. *F16K 21/18* (2013.01); *B67D 7/465* (2013.01); *F16K 21/20* (2013.01)

(56) References Cited

U.S. PATENT DOCUMENTS

| | | | | |
|---|---|---|---|---|
| 3,156,253 A * | 11/1964 | Marderness | ............ | F16K 1/126 137/220 |
| 3,562,455 A * | 2/1971 | McQueen | ............ | H01H 35/405 137/341 |
| 3,587,622 A | 6/1971 | Hardison | | |
| 4,024,887 A * | 5/1977 | McGregor | ............. | F15C 1/003 137/386 |
| 4,112,965 A * | 9/1978 | Kruschik | ................ | F16K 1/126 137/219 |
| 4,437,485 A * | 3/1984 | Goodman | ............. | F16K 15/063 137/220 |
| 4,447,706 A * | 5/1984 | Eder | ...................... | F23D 11/44 123/549 |
| 5,007,450 A * | 4/1991 | Babb | ...................... | F16K 31/32 137/315.08 |
| 5,485,542 A * | 1/1996 | Ericson | ................. | F16K 49/002 137/341 |
| 5,522,415 A * | 6/1996 | Hopenfeld | ............. | B65D 90/26 137/15.17 |
| 5,915,410 A * | 6/1999 | Zajac | ........................ | F16K 1/54 137/341 |
| 5,975,119 A * | 11/1999 | Silva | ........................ | E03B 7/12 137/341 |
| 6,837,262 B2 * | 1/2005 | Cortez | .................... | B60K 15/04 137/15.16 |
| 2001/0047826 A1* | 12/2001 | Ishigaki | ............ | F16K 31/1221 137/341 |
| 2007/0163672 A1 | 7/2007 | Luntz et al. | | |
| 2008/0011359 A1 | 1/2008 | Cortez | | |
| 2008/0202600 A1 | 8/2008 | Peattie et al. | | |
| 2014/0196443 A1 | 7/2014 | Larsson et al. | | |
| 2016/0169411 A1* | 6/2016 | Fahrner | ................. | F16K 49/002 137/15.18 |

* cited by examiner

AUTOMATIC FILL SYSTEM

FIELD OF THE DISCLOSURE

The disclosure generally relates to an automatic fill system having a valve assembly. More particularly, the disclosure relates to an automatic fill system having a fluid level sensor and heating element integrated into the valve assembly.

BACKGROUND ART

A quick, reliable system for automatically filling a fluid tank is desirable in many applications. For example, in the transportation industry, large vehicles need fluid tanks to be refilled quickly and with minimal oversight in order to reduce costs, keep productivity high, and the like.

Many systems currently require a user to determine the fluid level in the tank during filling. This creates a high level of oversight by the user along with the risk of overfilling the tank resulting in spillage. Furthermore, some refilling systems are used to fill tanks containing water-based fluid mixtures. When operating in cold temperatures, the fluid mixtures may freeze within the nozzle of the refilling system and cause filling failures, filling delays, and the like. For example, large vehicles often need to quickly refill fluid tanks containing diesel exhaust fluid (DEF) in cold weather. Accordingly, there is a need for an improved automatic fill system.

SUMMARY OF THE DISCLOSURE

There has thus been outlined, rather broadly, certain aspects of the disclosure in order that the detailed description thereof herein may be better understood and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

The disclosure provides an automatic fill system that includes a fluid tank, a transfer hose, and a valve assembly. The valve assembly has a first end having an outlet orifice configured to be received within the fluid tank. The valve assembly also includes a second end configured to be connected in fluid communication with the transfer hose with the second end having an inlet orifice. The valve assembly also includes at least one fluid passageway between the inlet orifice and the outlet orifice, and a check valve coupled to a spring and a seal. The seal is configured to be slidably moveable within a piston chamber. The valve assembly may further include a heating element located within a heating element chamber configured to heat the valve assembly. Finally, the valve assembly includes a jet level sensor with a sensor inlet and a sensor outlet. The jet level sensor is in fluid communication with the piston chamber.

In one aspect, an automatic fill system includes a fluid tank that is configured to hold a fluid received from a transfer hose, a valve assembly having a first end configured to be received within the fluid tank, the first end including an outlet orifice, a second end configured to be connected in fluid communication with the transfer hose, the second end including an inlet orifice, at least one fluid passageway between the inlet orifice and the outlet orifice, a check valve coupled to a spring and a seal, the seal configured to be slidably moveable within a piston chamber, and a level sensor comprising a sensor inlet and a sensor outlet, the level sensor in fluid communication with the piston chamber.

In another aspect, an automatic fill system includes a fluid tank that is configured to hold a fluid received from a transfer hose, a valve assembly having a first end configured to be received within the fluid tank, the first end including an outlet orifice, a second end configured to be connected in fluid communication with the transfer hose, the second end including an inlet orifice, at least one fluid passageway between the inlet orifice and the outlet orifice, a check valve coupled to a spring and a seal, the seal configured to be slidably moveable within a piston chamber, and a level sensor comprising a sensor inlet and a sensor outlet, the level sensor in fluid communication with the piston chamber where the fluid communication is disrupted by the level of fluid within the fluid tank.

As such, those skilled in the art will appreciate that the conception upon which this disclosure is based may readily be utilized as a basis for the design of other structures, methods, and systems for carrying out the several purposes of the invention. It is important, therefore, that the claims be regarded as including such equivalent constructions insofar as they do not depart from the spirit and scope of the disclosure.

DETAILED DESCRIPTION

Reference in this specification to "one aspect," "an aspect," "other aspects," "one or more aspects," or the like means that a particular feature, structure, or characteristic described in connection with the aspect is included in at least one aspect of the disclosure. The appearance of, for example, "in one aspect" in various places in the specification are not necessarily all referring to the same aspect, nor are separate or alternative aspects mutually exclusive of other aspects. Moreover, various features are described which may be exhibited by some aspects and not by others. Similarly, various requirements are described which may be requirements for some aspects but not other aspects.

Figure 1:
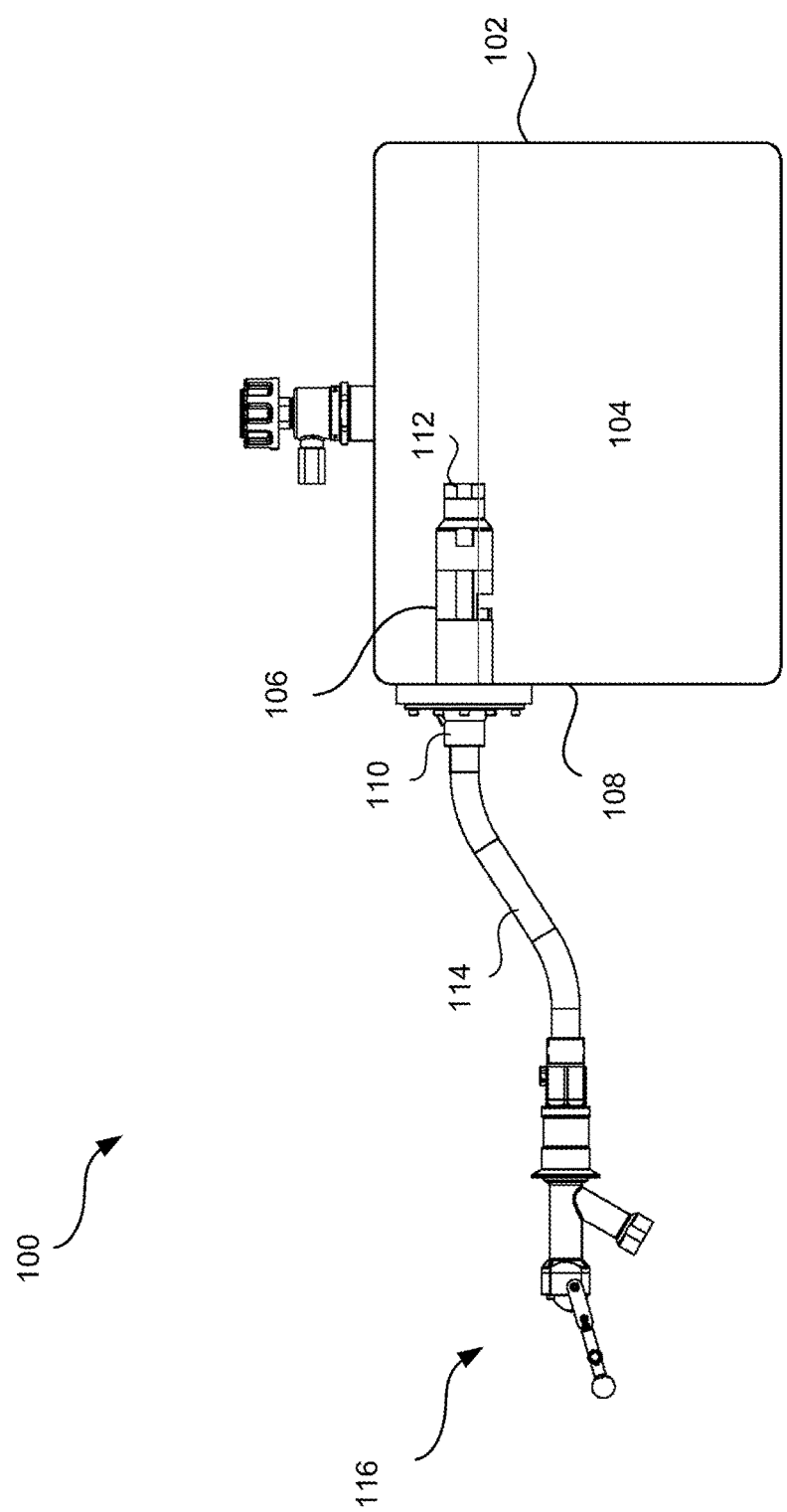
FIG. 1 is a partial cross-sectional side view of an automatic fill system according to an aspect of the present disclosure.

FIG. 1 illustrates a side view of an automatic fill system 100 according to an aspect of the present invention. The automatic fill system 100 includes a fluid tank 102 containing a fluid 104. A valve assembly 106 may be connected in fluid communication with the fluid tank 102 along a wall 108 of the fluid tank 102. The valve assembly 106 may be mounted anywhere on the fluid tank 102 including the top (See FIG. 5). The valve assembly 106 may have an inlet orifice 110 and an outlet orifice 112. The inlet orifice 110 may be in fluid connection with a transfer hose 114. The transfer hose 114 may receive a fluid at one end 116. The fluid 104 may be delivered from the transfer hose 114 through the valve assembly 106 and into the fluid tank 102 through the outlet orifice 112. The fluid 104 may be any fluid used in a machine and/or vehicle including fuel, diesel exhaust fluid (DEF), hydraulic fluid, coolant fluid, lubricant, transmission fluid, and the like.

Figure 2:
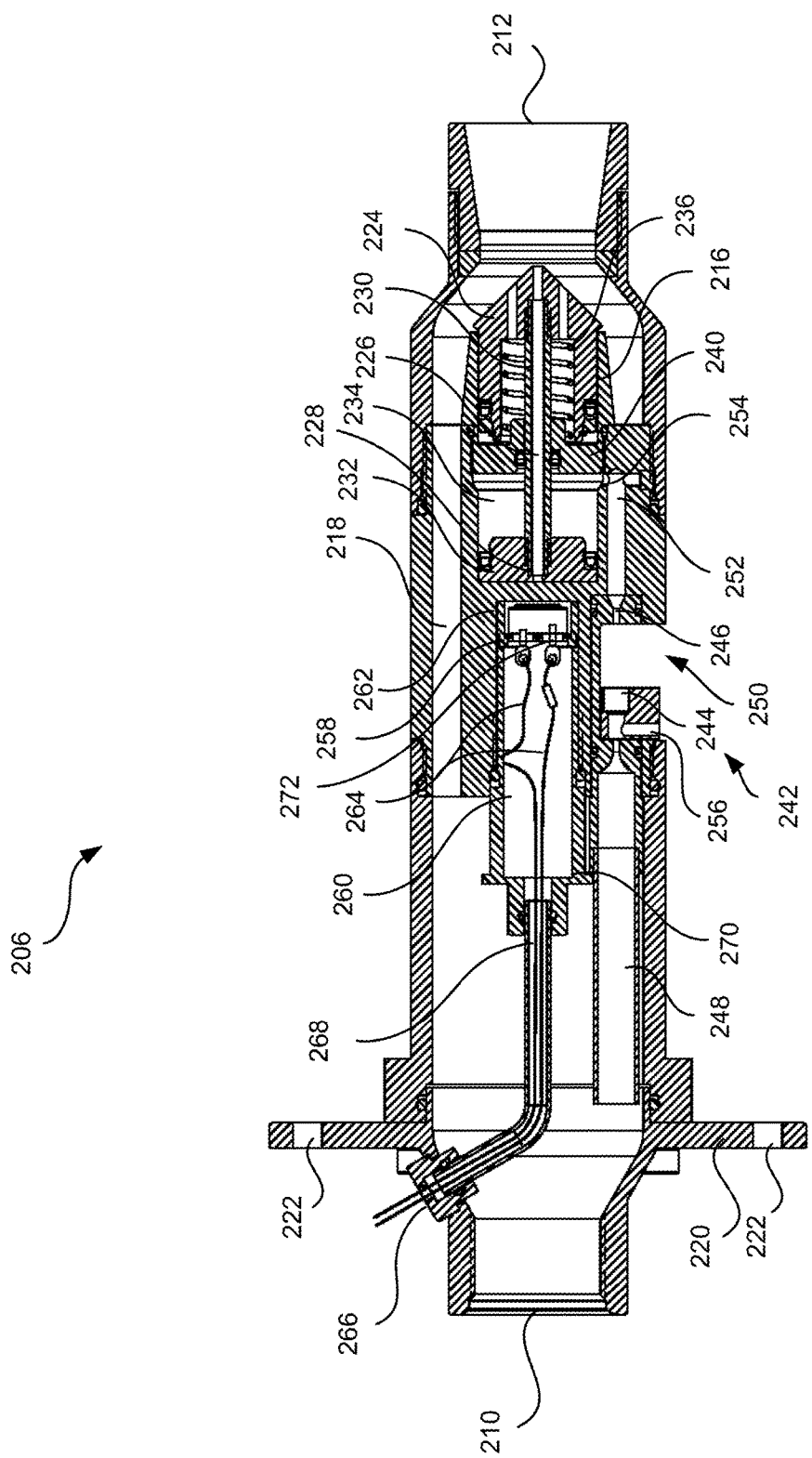
FIG. 2 is a cross-sectional view of a valve assembly in an open configuration according to an aspect of the disclosure.
Figure 3:
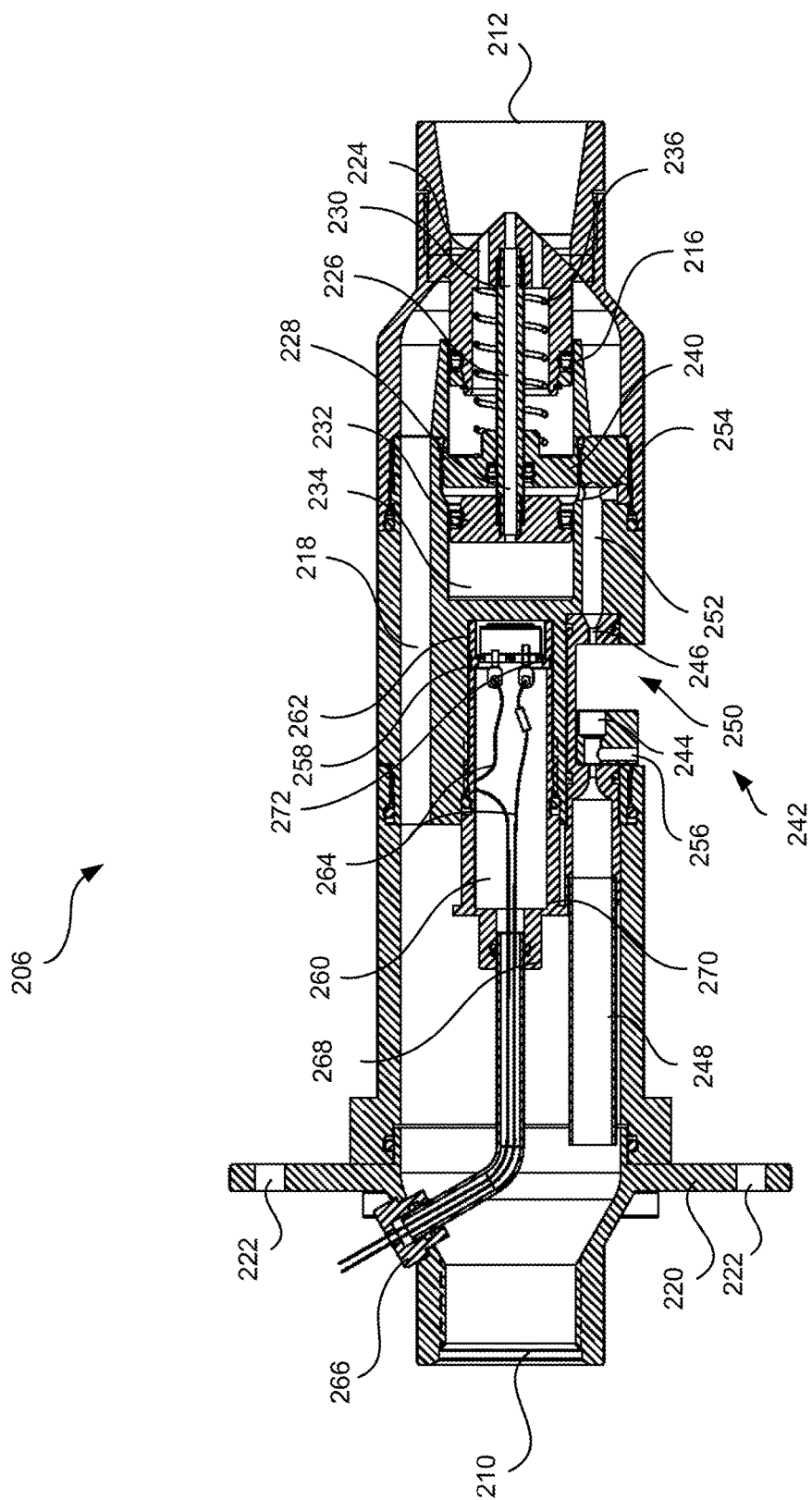
FIG. 3 is a cross-sectional view of the valve assembly of FIG. 2 in a closed configuration according to an aspect of the disclosure

FIG. 2 illustrates a cross-sectional view of the valve assembly 206 in an open configuration according to an aspect of the present invention; and FIG. 3 is a cross-sectional view of the valve assembly of FIG. 2 in a closed configuration according to an aspect of the invention. The valve assembly 206 includes an inlet orifice 210 and an outlet orifice 212. The valve assembly 206 includes a check valve assembly 216 at the outlet orifice 212. When the check valve assembly 216 is in an open configuration, a primary fluid passageway 218 allows fluid to flow from the inlet orifice 210 to the outlet orifice 212. When the check valve assembly 216 is in a closed configuration, fluid flow is restricted between the inlet orifice 210 and the outlet orifice 212.

The valve assembly 206 may be arranged with and/or inserted into the wall 108 of the fluid tank 102 at a wall opening. The check valve assembly 216 may be secured to the fluid tank 102 along at least one flange mount 220. The flange mount 220 may have an outer diameter greater than the outer diameter of the wall opening to restrict the movement of the valve assembly 206 during the operation of the automatic fill system 100. The flange mount 220 may be secured to wall 108 with any fastening methods known in the art including a bolt, a threaded fastener, a rivet, or other mechanical fastener that may extend through a hole 222. Other mounting constructions not including a flange mount 220 are contemplated as well.

The check valve assembly 216 includes a check valve 224 coupled to a piston 226 having a first end 228 and a second end 230. The check valve 224 may move with the piston 226 between the first end 228 and the second end 230. At the first end 228, a seal 232 may be coupled to the piston 226. The seal 232 may prevent fluid from within the inside of the piston chamber 234 from escaping. The seal 232 may be a spring energized seal that reduces friction to facilitate movement of the check valve 224. The valve assembly 206 may also include a spring 236. The check valve 224 may be biased into a closed position when the piston chamber 234 is not pressurized by a fluid within the piston chamber 234. The spring 236 may be coupled to the check valve 224 at one end of the spring 236 and a guide 240 at the other end to apply a pressure to close the check valve 224.

During operation, the fluid 104 may flow from the inlet orifice 210 to the outlet orifice 212. The check valve 224 may open in a direction opposite the direction of fluid flow. That is, the check valve 224 actuates towards the inlet orifice 210 as it is opening and actuates towards the outlet orifice 212 as it is closing. The construction of the check valve 224 in such a fashion may prevent the check valve 224 from opening due to pressure from the fluid flow. In addition, the check valve 224 may be constructed such that pressure that builds up in the valve assembly 206 during shutoff is slightly biased in favor of shutoff. The diameter of the check valve 224 at the point of contact with the outlet orifice 212 is preferably slightly larger than the diameter of the sliding, tubular part of the check valve 224, which results in a net pressure acting in the direction of closing. In short, there is a closing force generated by the pressure acting against the check valve 224 that aids in preventing override of the shutoff.

The valve assembly 206 may also include a jet level sensor 242 integrated with the valve assembly 206. The jet level sensor 242 includes a sensor outlet 244 and a sensor inlet 246. To facilitate an increased pressure of fluid flow through the jet level sensor 242, the diameter of the sensor outlet 244 may be larger than a diameter of the sensor inlet 246. A secondary fluid passageway 248 may be formed in the valve assembly 206 to divert some of the fluid from the inlet orifice 210 to the jet level sensor 242 during operation of the valve assembly 206. The jet level sensor 242 may be configured to be removable from the main body of the valve assembly 206 to facilitate repair and maintenance of the jet level sensor 242.

As the fluid tank 102 is being filled and before the fluid level of the fluid tank 102 reaches the jet level sensor 242, some pressurized fluid entering the inlet orifice 210 may flow across (a jet of fluid flow/fluid jet stream) the secondary fluid passageway 248 and to the sensor outlet 244. The sensor outlet 244 may include a diverging nozzle. A small jet stream of the pressurized fluid may be transmitted to the sensor inlet 246 across the gap 250. The pressurized fluid may continue to flow into the piston chamber 234 through the passageway 252 and the piston chamber inlet 254. The fluid in the piston chamber 234 may pressurize the piston chamber 234 and apply a force on the seal 232. The pressurized fluid within the piston chamber 234 may cause the check valve 224 to open and allow the pressurized fluid to flow from the inlet orifice 210 through the primary fluid passageway 218 and out the outlet orifice 212.

As the fluid level in the fluid tank 102 increases, the fluid level may rise to a level to fill the gap 250 and submerge the jet level sensor 242. The presence of fluid in the gap 250 may interfere with the pressurized fluid jet stream between the sensor outlet 244 and the sensor inlet 246 causing the pressure at the sensor inlet 246 to drop significantly. The pressure of the fluid within the passageway 252 and piston chamber 234 may similarly decrease. As the pressure within the piston chamber 234 drops, the force of the spring 236 in the check valve assembly 216 may overcome the pressure in the piston chamber 234. Thus, the spring 236 may cause the check valve 224 to move towards the outlet orifice 212 and close as shown in FIG. 3.

A significant residual hydraulic signal (a jet of fluid flow/fluid jet stream) may still be transmitted across the gap 250 in the jet level sensor 242 even when the jet level sensor 242 is fully submerged in a fluid. In some aspects, the jet level sensor 242 may include a peripheral port 256 extending perpendicularly from the sensor outlet 244 to the exterior surface of the valve assembly 206. In particular, the peripheral port 256 may be perpendicularly oriented with respect to the pressurized fluid jet stream between the sensor outlet 244 and the sensor inlet 246. When the sensor inlet 246 is submerged, fluid may be drawn into the peripheral port 256 by the Venturi effect, which creates a secondary stream that reduces the stream of fluid that shoots across the gap 250. This secondary stream may dramatically reduce any residual fluid flow signal between the sensor outlet 244 and sensor inlet 246 when the jet level sensor 242 is fully submerged and allowing the check valve 224 to close completely.

The valve assembly 206 may include a heating element 258 located in a heating element chamber 260. The heating element 258 may be located at a first end 262 of the heating element chamber 260. In the aspect disclosed in FIG. 2, the heating element 258 covers an entire inner diameter of the heating element chamber 260, and extends along the length of the heating element chamber 260. The first end 262 may be located towards the seal 232 of the check valve assembly 216. Once the heating element 258 is heated, the heating element 258 may prevent fluid within the piston chamber 234 from freezing. The heating element 258 may be produce heat through resistive or induction heating. For example, the heating element 258 may be an etched metal foil or a wound, metallic coil. The heating element 258 may be connected to electrical wires 264. The electrical wires 264 may connect to a vehicle power interface 266 or other power source located outside of the valve assembly 206. The electrical wires 264 may connect from the heating element 258 to the vehicle power interface 266 through a wire guide channel 268 located within the valve's assembly 206 and be coupled to at a second end 270 of the heating element chamber 260.

The heating element chamber 260 may be located within the center of the valve assembly 206. The walls of the heating element chamber 260 may contact the primary fluid passageway 218 and the secondary fluid passageway 248. The heat generated by the heating element 258 may also prevent fluid within the primary fluid passageway 218 and the secondary fluid passageway 248 from freezing.

The heating element 258 may include a thermostat 272 to monitor a temperature within the heating element chamber 260 and/or center of the valve assembly 206. The thermostat 272 may monitor and/or provide a closed-loop temperature control. The thermostat 272 may also be implemented with other methods known in the art to monitor temperature. The thermostat 272 may be integrated with the heating element 258 as a single component. In other aspects, the thermostat 272 may be a separate component, apart from the heating element 258. In some aspects, the heating element chamber 260 may be removably coupled to the valve assembly 206. The heating element chamber 260 and heating element 258 may be removed from the valve assembly 206 to facilitate repair and maintenance of the heating element 258 and/or thermostat 272.

Figure 4:
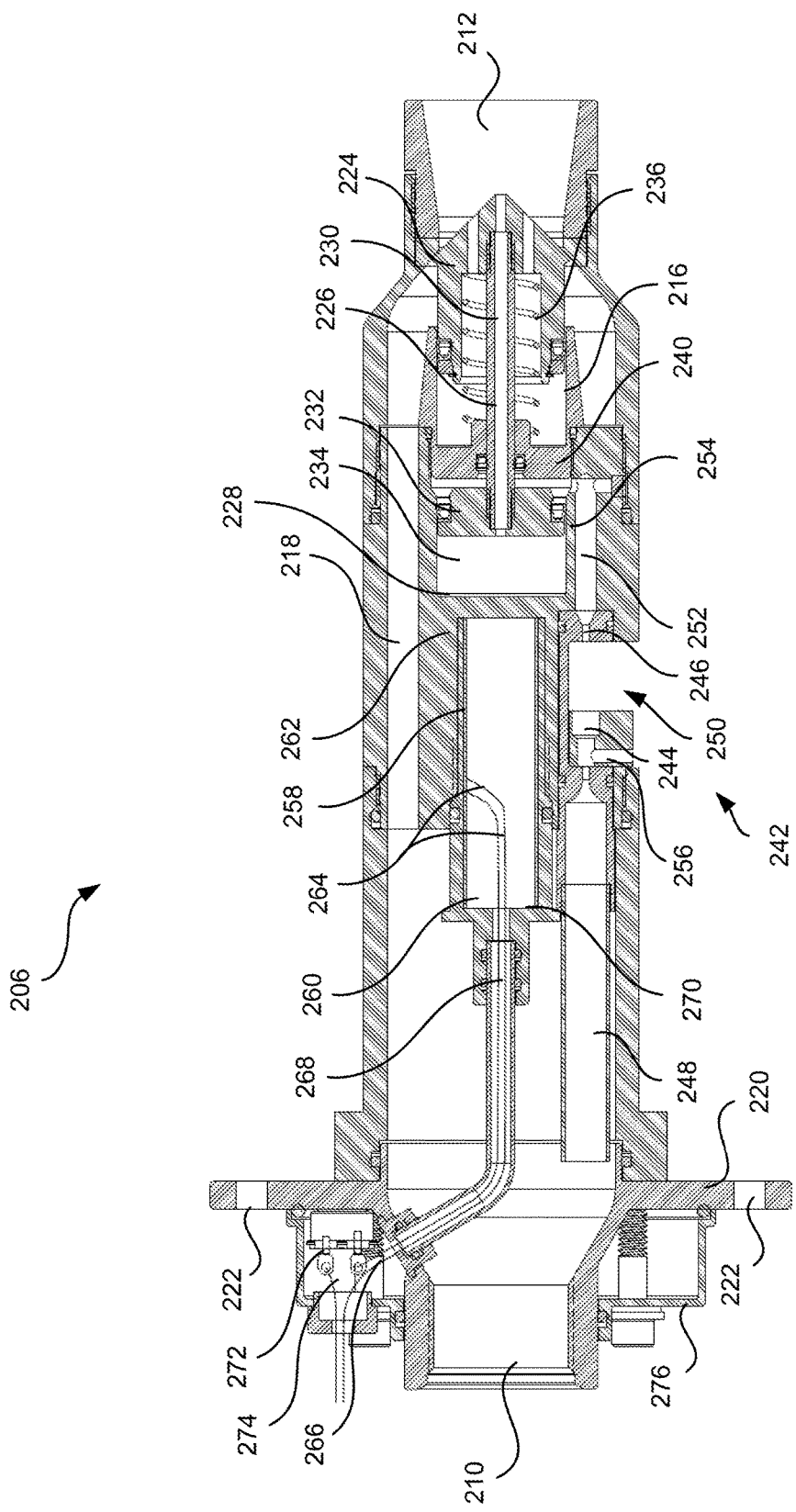
FIG. 4 is a cross-sectional view of a valve assembly according to another aspect of the disclosure.

In the aspect shown in FIG. 4, the thermostat 272 may be a separate component from the heating element 258. The thermostat 272 may be located outside of the heating chamber 260. In particular, the thermostat 272 may be located in a protective cavity 274 defined by the protective cover 276 and the flange mount 220. Having the thermostat 272 located outside of the heating chamber 260 may facilitate easier maintenance of the thermostat 272.

Figure 5:
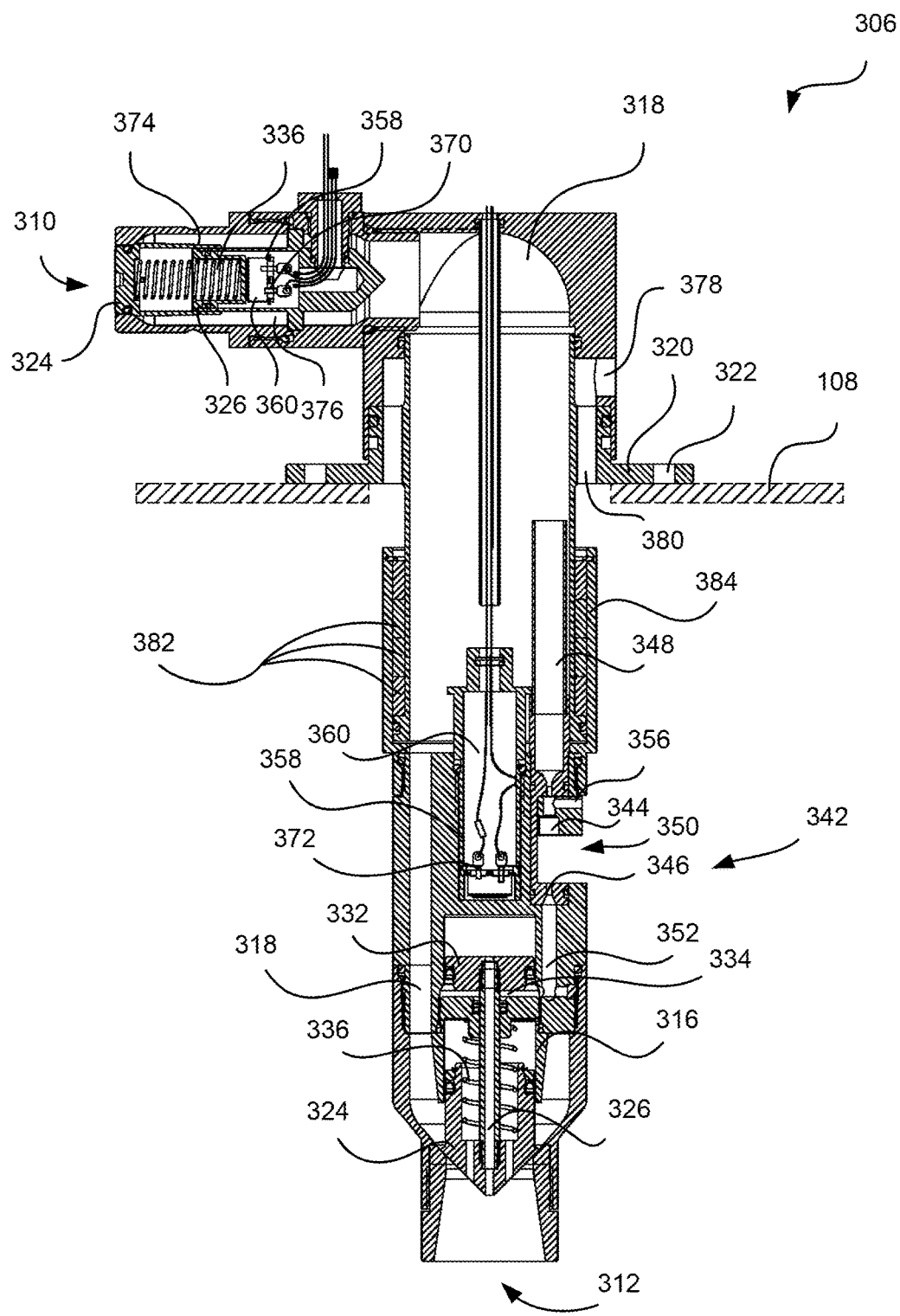
FIG. 5 is a cross-sectional view of a valve assembly according to yet another aspect of the disclosure.

FIG. 5 illustrates a valve assembly 306 according to another aspect of the disclosure. The valve assembly 306 similarly includes an inlet orifice 310 and outlet orifice 312. The valve assembly 306 includes a first check valve assembly 316 and a second check valve assembly 374. When both the first check valve assembly 316 and second check valve assembly 374 are in an open configuration, fluid may flow from the inlet orifice 310 to the outlet orifice 312 through the primary fluid passageway 318.

The valve assembly 306 may similarly be inserted into the wall 108 of the fluid tank 102 at a wall opening. The valve assembly 306 may be inserted through a wall opening located at the top of the fluid tank 102, unlike the valve assembly 206, which may be inserted in a side opening of the fluid tank 102. The valve assembly 306 may be secured to the fluid tank 102 along at least one flange mount 320 and at least one fastener hole 322 for a bolt, a threaded fastener, or other mechanical fastener known in the art.

The first check valve assembly 316 and the second check valve assembly 374 may each include a check valve 324 coupled to a piston 326. The first check valve assembly 316 and the second check valve assembly 374 may each also include a spring 336 coupled to the check valve 324 to bias the check valve 324 into a closed position.

The first check valve assembly 316 includes a seal 332 coupled to the piston 326 and configured to slidably move within the piston chamber 334. The first check valve assembly 316 operates similarly to the check valve assembly 216 described previously. When the piston chamber 334 is pressurized, the check valve 324 may be actuated to an open configuration. When the piston chamber 334 is de-pressurized, the check valve 324 may be actuated to a closed configuration. As shown in FIG. 5, the check valve 324 is in a closed configuration.

The second check valve assembly 374 may be located at the inlet orifice 310. As mentioned previously, the second check valve assembly 374 includes a spring 336 to bias the check valve 324 closed. During normal operation, a corresponding component on a transfer hose will push the check valve 324 open manually. This will allow fluid to flow through the inlet orifice 310 through the fluid passageway 376.

The valve assembly 306 also include a jet level sensor 342 integrated with the valve assembly 306. The jet level sensor 342 may be located along a portion of the valve assembly 306 inserted into the fluid tank 102. The jet level sensor 342 includes a sensor outlet 344 and a sensor inlet 346. The jet level sensor 342 may be designed and operate in a similar fashion as the jet level sensor 242 described above with respect to FIG. 2. During operation of the valve assembly 306, a secondary fluid passageway 348 may be formed in the valve assembly 206 to divert some of the fluid from the inlet orifice 310 to the jet level sensor 342. A pressurized fluid stream may be transmitted from the sensor outlet 344 across the gap 350 to the sensor inlet 346. The pressurized fluid stream may continue to flow through the passageway 352 to pressurize the piston chamber 334 and cause the first check valve assembly 316 to open. In some aspects, the valve assembly 306 may also include a peripheral port 356 that may be implemented at the jet level sensor 342 in a similar fashion as the peripheral port 256 described above with respect to FIG. 2.

The valve assembly 306 may include at least one heating element 358 and heating element chamber 360. The heating element 358 may be located near the first check valve assembly 316 and the second check valve assembly 374. In the aspect disclosed in FIG. 5, the heating element 358 covers the entire inner diameter of the heating element chamber 360, and extends along the length of the heating element chamber 360. Once heated, the heating elements 358 may prevent fluid around the first check valve assembly 316 and/or second check valve assembly 374 from freezing. One or more of the heating elements 358 may include a thermostat 372. The thermostat 372 may be integrated with the heating element 358 or be a separate component from the heating element 358.

The valve assembly 306 may include a vent outlet port 378. The vent outlet port 378 may be exposed to open air. The vent outlet port 378 may be in fluid communication with the fluid tank 102 along the vent passage 380. The vent outlet port 378 may prevent any air pressure build up (or vacuum build up) in the fluid tank 102 during operation of the valve assembly 306.

The valve assembly 306 may also include a plurality of spacer rings 382 mounted around the valve assembly body. The spacer rings 382 may be selectively removed from the valve assembly 306 and used to adjust the depth the valve assembly 306 extends into the fluid tank 102. The outer body 384 of the valve assembly 306 may be coupled to the spacer rings 382. A user may remove spacer rings 382 to adjust the desired fill volume/fill level of the fluid tank 102. As spacer rings 382 are removed, the valve assembly 306 may extend further into the fluid tank 102. With the valve assembly 306 extending further into the fluid tank 102, the jet level sensor 342 may come into contact with the fluid level of the fluid tank 102 at a lower fill volume of the fluid tank 102. The jet level sensor 342 may subsequently trigger sooner (at a lower fluid level) and cause the first check valve assembly 316 to close.

While disclosure has been described in terms of what are presently considered to be specific aspects, the disclosure need not be limited to the disclosed aspects. It is intended to cover various modifications and similar arrangements included within the spirit and scope of the claims, the scope of which should be accorded the broadest interpretation so as to encompass all such modifications and similar structures. The present disclosure includes any and all aspects of the following claims.

The invention claimed is:

1. A combination check valve and level sensor device, comprising:
   a valve housing having an inlet and an outlet;
   a piston chamber longitudinally disposed within the housing;
   a piston operably mounted in the piston chamber and coupled to a check valve, whereby a primary fluid passage is established about the check valve when a position of the piston is axially recessed within the piston chamber away from the valve housing outlet, the check valve comprising a tubular section having a tubular diameter, and a conical contact portion having a conical diameter that is larger than the tubular diameter;
   a spring within the check valve biasing the check valve to engage the outlet and close the primary fluid passage;
   a secondary passageway within the valve housing from the inlet to a level sensor outlet;
   a level sensor inlet formed in the valve housing opposite the level sensor outlet;
   a level sensor passageway fluidly connecting the level sensor inlet to the piston chamber;
   a radially disposed peripheral port in the valve housing upstream of the level sensor outlet and configured to draw in fluid and slow a flow of fluid exiting the level sensor outlet;
   whereby a fluid pressure in the level sensor passageway controls a position of the piston.

2. The combination check valve and level sensor device of claim 1, further comprising a heating chamber within the valve housing and upstream of the piston chamber, the heating chamber comprising a heating element.

3. The combination check valve and level sensor device of claim 2, further comprising a wire guide channel within the valve housing connecting the heating element to a power supply.

4. The combination check valve and level sensor device of claim 2, wherein the heating chamber is centrally disposed within the valve housing.

5. The combination check valve and level sensor device of claim 4, wherein the heating chamber is removably coupled to the valve housing.

6. The combination check valve and level sensor device of claim 2, further comprising a thermostat within the heating chamber for monitoring a temperature within the heating chamber.

7. The combination check valve and level sensor device of claim 2, further comprising a thermostat within the heating chamber for monitoring a temperature at a center of the valve housing.

8. The combination check valve and level sensor device of claim 2, further comprising a thermostat is-located outside of the heating chamber but inside the valve housing.

9. The combination check valve and level sensor device of claim 8, wherein the thermostat is positioned on a first side of a flange mount on the valve housing, and the heating chamber is positioned on a second side of the flange mount.

* * * * *